United States Patent
Arisi et al.

(10) Patent No.: US 11,339,718 B2
(45) Date of Patent: May 24, 2022

(54) MINICORE COOLING PASSAGE NETWORK HAVING TRIP STRIPS

(71) Applicant: United Technologies Corporation, Farmington, CT (US)

(72) Inventors: Allan N. Arisi, Manchester, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 203 days.

(21) Appl. No.: 16/594,146

(22) Filed: Oct. 7, 2019

(65) Prior Publication Data
US 2021/0071580 A1   Mar. 11, 2021

Related U.S. Application Data (60) Provisional application No. 62/757,937, filed on Nov. 9, 2018.

(51) Int. Cl.
*F02C 7/00* (2006.01)
*F02C 7/12* (2006.01)
*F02C 3/04* (2006.01)

(52) U.S. Cl.
CPC .................. *F02C 7/12* (2013.01); *F02C 3/04* (2013.01); *F05D 2220/32* (2013.01)

(58) Field of Classification Search
CPC . F01D 5/18; F01D 5/186; F01D 5/187; F01D 5/226; F01D 5/201; F01D 5/202;
(Continued)

(56) References Cited

U.S. PATENT DOCUMENTS

| | | | |
|---|---|---|---|
| 6,254,334 B1 * | 7/2001 | LaFleur | F01D 5/186 415/115 |
| 6,681,578 B1 * | 1/2004 | Bunker | F23R 3/005 60/759 |

(Continued)

FOREIGN PATENT DOCUMENTS

| | | |
|---|---|---|
| EP | 1655452 | 5/2006 |
| EP | 1840330 | 10/2007 |

(Continued)

OTHER PUBLICATIONS

European Search Report for European Patent Application No. 19208287.3 completed Dec. 20, 2019.

*Primary Examiner* — Edwin Kang
(74) *Attorney, Agent, or Firm* — Carlson, Gaskey & Olds, P.C.

(57) ABSTRACT

A gas turbine engine article includes an article wall that defines leading and trailing ends and first and second sides that join the leading and trailing ends. The article wall defines a cavity. A cooling passage network is embedded in the article wall between inner and outer portions of the article wall. The cooling passage network has an inlet orifice through the inner portion of the article wall to receive cooling air from the cavity, a plurality of sub-passages that extend axially from the at least one inlet orifice, at least one outlet orifice through the outer portion of the airfoil wall, and trip strips for mixing cooling air in the cooling passage network.

5 Claims, 6 Drawing Sheets

(58) Field of Classification Search
CPC .......... F01D 5/203; F01D 5/204; F01D 5/221; F01D 5/2212; F01D 5/2214; F01D 5/22141
See application file for complete search history.

(56) References Cited

U.S. PATENT DOCUMENTS

| | | | |
|---|---|---|---|
| 8,511,994 B2 | 8/2013 | Devore et al. | |
| 9,605,544 B2 | 3/2017 | Tibott et al. | |
| 2005/0106021 A1* | 5/2005 | Bunker | F28F 13/12 416/97 R |
| 2006/0060334 A1* | 3/2006 | Joe | F01D 5/187 165/109.1 |
| 2009/0226300 A1* | 9/2009 | Knapp | F01D 11/08 415/116 |
| 2010/0054915 A1* | 3/2010 | Devore | F01D 5/189 415/116 |
| 2013/0243575 A1* | 9/2013 | Zelesky | F01D 5/187 415/116 |
| 2013/0251538 A1* | 9/2013 | Zess | F01D 5/187 416/90 R |
| 2014/0093361 A1* | 4/2014 | Riley | F01D 9/02 415/178 |
| 2014/0093386 A1* | 4/2014 | Pointon | F01D 5/20 416/96 R |
| 2016/0130951 A1* | 5/2016 | Henze | F01D 5/187 416/95 |
| 2016/0169512 A1* | 6/2016 | Tu | F23R 3/06 60/754 |
| 2016/0312624 A1* | 10/2016 | Loricco | F01D 25/12 |
| 2017/0030202 A1* | 2/2017 | Itzel | F01D 5/188 |
| 2017/0101881 A1* | 4/2017 | Romanov | F01D 5/187 |
| 2017/0226885 A1* | 8/2017 | Clum | F01D 11/08 |
| 2017/0292398 A1* | 10/2017 | Wasserman | F01D 5/12 |
| 2019/0013258 A1* | 1/2019 | Malouin, Jr. | F28D 1/0246 |
| 2019/0040745 A1* | 2/2019 | Clark | F23R 3/002 |

FOREIGN PATENT DOCUMENTS

| | | |
|---|---|---|
| EP | 2022940 | 2/2009 |
| EP | 2565383 | 3/2013 |
| WO | 2015065671 | 5/2015 |

* cited by examiner

MINICORE COOLING PASSAGE NETWORK HAVING TRIP STRIPS

CROSS-REFERENCE TO RELATED APPLICATION

This application claims priority to U.S. Provisional Application No. 62/757,937 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine article according to an example of the present disclosure includes an article wall that defines a cavity and a cooling passage network embedded in the article wall between inner and outer portions of the article wall. The cooling passage network has an inlet orifice through the inner portion of the airfoil outer wall to receive cooling air from the cavity, a plurality of sub-passages that extend axially from the at least one inlet orifice, at least one outlet orifice through the outer portion of the article wall, and trip strips for mixing cooling air in the cooling passage network.

In a further embodiment of any of the foregoing embodiments, at least one of the trip strips is elongated.

In a further embodiment of any of the foregoing embodiments, a first one of the trip strips is a partial ring that extends around an interior region greater than 180°.

In a further embodiment of any of the foregoing embodiments, one or more of the trip strips are within the interior region.

In a further embodiment of any of the foregoing embodiments, one of the trip strips that is within the interior region is a ring.

In a further embodiment of any of the foregoing embodiments, the trips strips include a first set of trip strips that have a first common orientation and a second set of trip strips that have a second common orientation that is different than the first common orientation.

In a further embodiment of any of the foregoing embodiments, the first common orientation and the second common orientation are perpendicular.

In a further embodiment of any of the foregoing embodiments, at least one of the trip strips is semi-circular.

In a further embodiment of any of the foregoing embodiments, at least one of the trips strips is circular.

In a further embodiment of any of the foregoing embodiments, at least one of the trips strips has a zigzag configuration.

In a further embodiment of any of the foregoing embodiments, at least one of the trip strips projects from the outer portion of the airfoil wall and is aligned opposite the inlet orifice.

In a further embodiment of any of the foregoing embodiments, the at least one of the trip strips is a ring.

In a further embodiment of any of the foregoing embodiments, multiple ones of the trip strips project from the outer portion of the airfoil wall opposite the inlet orifice.

In a further embodiment of any of the foregoing embodiments, the inlet orifice opens to a radially-elongated manifold region of the cooling passage network that is upstream of the plurality of sub-passages, and the trip strips are in the radially-elongated manifold region.

A gas turbine engine according to an example of the present disclosure includes a compressor section, a combustor in fluid communication with the compressor section, and a turbine section in fluid communication with the combustor. The turbine section has a turbine engine article according to any of the foregoing embodiments.

In a further embodiment of any of the foregoing embodiments, a first one of the trip strips is a partial ring that extends around an interior region greater than 180°.

In a further embodiment of any of the foregoing embodiments, one or more of the trip strips are within the interior region.

In a further embodiment of any of the foregoing embodiments, one of the trip strips that is within the interior region is a ring.

In a further embodiment of any of the foregoing embodiments, at least one of the trips strips has a zigzag configuration.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
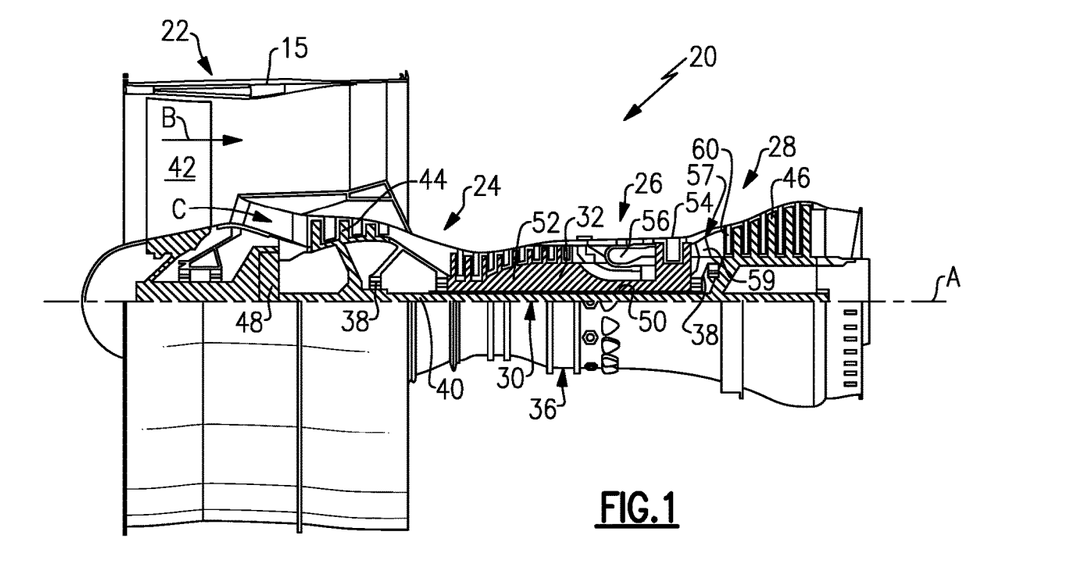
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^ 0.5. The "Low corrected fan tip speed" as disclosed herein according to one non-limiting embodiment is less than about 1150 ft/second (350.5 meters/second).

Figure 2:
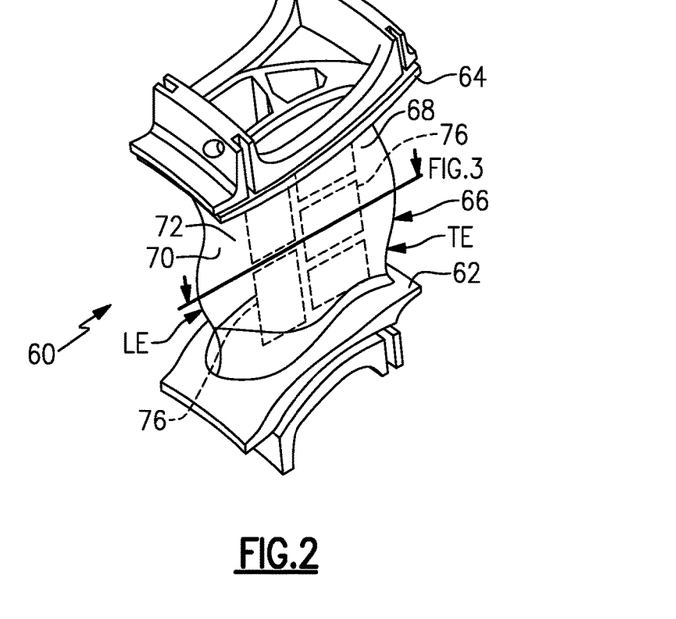
FIG. 2 illustrates an airfoil of the engine of FIG. 1.

FIG. 2 illustrates a representative example of a gas turbine engine article, namely a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades, blade outer air seals, and combustor panels. The turbine airfoil 60 is also shown in a cross-sectioned view in FIG. 3.

Figure 3:
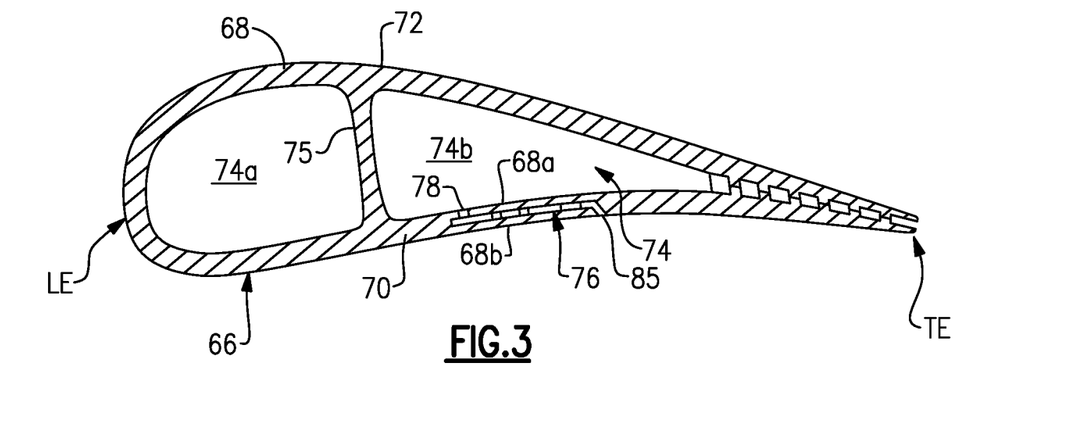
FIG. 3 illustrates a sectioned view of the airfoil of FIG. 3.

Referring to FIGS. 2 and 3, the turbine airfoil 60 includes an inner platform 62, an outer platform 64, and an airfoil section 66 that spans between the inner and outer platforms 62/64. The airfoil section 66 includes an airfoil outer wall 68 that delimits the profile of the airfoil section 66. The outer wall 68 defines a leading end (LE), a trailing end (TE), and first and second sides 70/72 that join the leading and trailing ends. In this example, the first side 70 is a pressure side and the second side 72 is a suction side. The outer wall 68 circumscribes an internal core cavity 74, which in this example is partitioned by a rib 75 into a forward core cavity 74a and an aft core cavity 74b. As will be appreciated, there may alternatively be only a single core cavity or there may be additional ribs to partition additional core cavities.

There is at least one cooling passage network 76 embedded in the airfoil outer wall 68 between inner and outer portions 68a/68b of the airfoil wall 68. For example, as shown (FIG. 3) one or more of the cooling passage networks 76 is embedded in the second side 72 of the outer wall 68, although one or more networks 76 could additionally or alternatively be embedded in the first side 70. The cooling passage networks 76 may also be referred to as minicores or minicore passages. A "minicore" or "minicore passage" is a reference to the small investment casting core that is typically used to make such an embedded passage, as opposed to a main core that is used to form a main or central core cavity in an airfoil.

Figure 4:
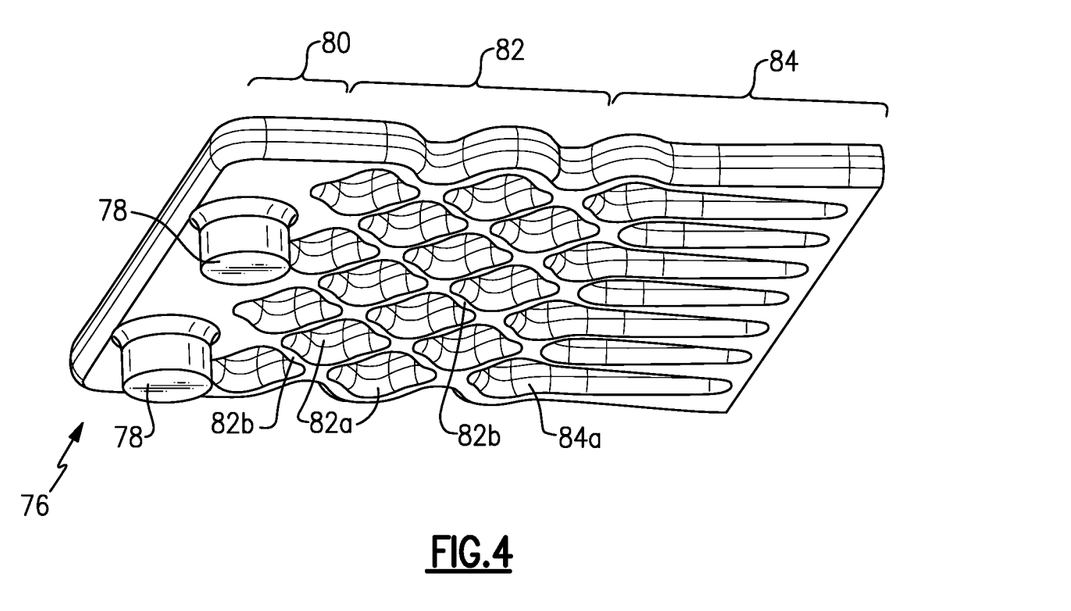
FIG. 4 illustrates an "inverse" or negative view of a cooling passage network of the airfoil of FIG. 3.

FIG. 4 shows an "inverse" or negative view of a representative one of the cooling passages networks 76. The inverse view is also representative of an investment core that may be used in an investment casting process to form the network 76 in the airfoil 60. Most typically, the investment casting core is injection molded from a material that contains ceramic or metal alloy. The investment core is shaped to form the cooling passage network 76. In the inverse view, solid structures of the investment core produce void structures in the cooling passage network 76 and void structures of the investment core produce solid structures in the cooling passage network 76. Thus, the investment core has the negative of the structural features of the cooling passage network 76. It is to be understood that although the inverse views presented herein may be used to describe features of the network 76, each negative view also represents an investment core and a corresponding cavity in a molding tool that is operable to molding the investment core.

The cooling passage network 76 includes at least one inlet orifice 78 through the inner portion 68a of the airfoil outer wall 68 (FIG. 3) to receive cooling air from the internal core cavity 74. The inlet orifice 78 may be, but is not limited to, round, rectangular, oval (racetrack) and may be sized appropriately to achieve desired flow and fill characteristics in the network 76. Most typically, the network 76 will include 2 inlet orifices 78. A single, exclusive inlet orifice 78 is also contemplated, as well as more than 2 inlet orifices 78, although fabrication may be challenging.

The inlet orifices 78 open into a radially-elongated manifold region 80, which serves to distribute the cooling air to a downstream sub-passage region 82. One of the inlet orifices 78 is located in the radially upper half of the manifold region 80 and the other of the inlet orifices 78 is in the radially lower half of the manifold region 80. Most typically, the radially upper and lower halves of the network 76 are mirror images, i.e., symmetric relative to the midline of the network between the two inlet orifices 78.

In this example, the region 82 includes an array of pedestals 82a that defines a plurality of sub-passages 82b there between. For instance, the pedestals 82a are provided in radially-aligned rows and may include up up to 10 rows that are staggered relative to each other, although in the illustrated example there are 4 rows. The pedestals 82a as shown have a lobed-diamond cross-sectional geometry in which each of the faces of the diamond are concave such that the tips of the diamond form rounded projections, i.e., a lobes. It is to be understood, however, that the pedestals 82a may alternatively be, but are not limit to, diamond or other polygonal shape, round, oval, or elliptical. The size of the pedestals 82a and sub-passages 82b may be determined based on the desired flow/pressure loss across the network 76 and heat transfer to the cooling air.

The sub-passages 82b are circuitous but extend generally axially from the manifold region 80 and inlet orifices 78 to a downstream exit region 84. In this example, the exit region 84 includes a plurality of flow guides 84a. For instance, the flow guides 84a have a teardrop shape and facilitate straightening and guiding flow into one or more outlet orifices 85 (FIG. 3) through the outer portion 68b of the airfoil wall 68. The axial extent of the regions 80/82/84 may be varied based on desired heat transfer, pressure loss, overall size of the network 76, and manufacturability.

Figure 5:
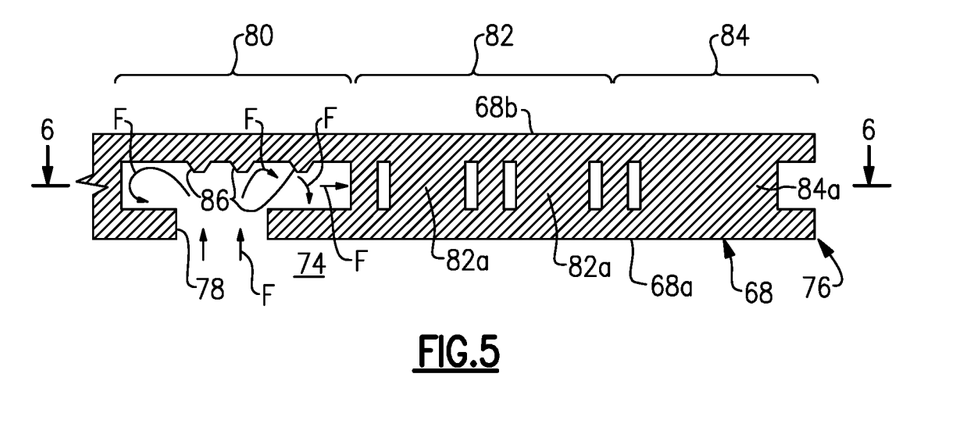
FIG. 5 illustrates a sectioned view of the cooling passage network of FIG. 3.
Figure 6:
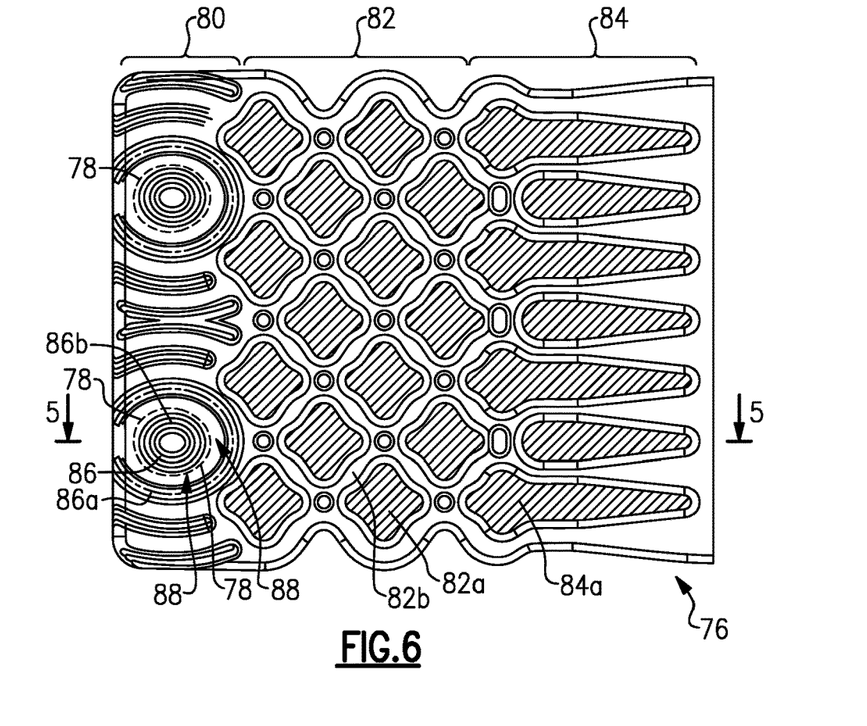
FIG. 6 illustrates another sectioned view of the cooling passage network of FIG. 5.

FIG. 5 shows a sectioned view through the outer wall 68 and cooling passage network 76, and FIG. 6 shows a sectioned view of FIG. 5. The cooling passage network 76 further includes trip strips 86 in the region 80, although the trip strips 86 may also extend into the region 82. The trip strips 86 serve to augment heat transfer in the region 80, upstream of the region 82. For instance, the trip strips 86 increase convective surface area for impingement by the cooling air from the inlet orifice 78, and the trips strips 86 turbulate (as represented at F) the boundary layer for axial flow in relatively lengthy regions 80, thereby augmenting heat transfer with the hot surfaces of the airfoil 60. In particular, the trip strips 86 may be located on the second portion 68b of the outer wall 68 to facilitate cooling, which unlike the first portion 68a, has a hot exterior surface and does not border the internal cavity 74.

The trip strips 86 may have a variety of different shapes but are generally projections that do not extend all the way across the passage and are elongated relative to their height. The height and spacing of the trip strips 86 may be tailored to achieve a desired pressure loss and heat transfer in the network 76. Most typically, the projections will also be of uniform width along their lengths. In the example shown, the trip strips 86 are conical in cross-section. The sides of the trip strips 86 may be angled or faceted to improve manufacturability.

During operation, the cooling air is provided to the internal core cavity 74, such as bleed air from the compressor section 24. The cooling air flows from the internal core cavity 74 into the inlet orifices 78 of the networks 76. The cooling air enters the manifold region 80 and then turns axially toward the sub-passage region 82. The cooling air then flows through the exit region 84 and then to the outlet orifice or orifices 85, where the cooling air can be discharged to the exterior surface of the outer wall 68 for airfoil surface film cooling.

For example, one or more of the trip strips, represented at 86a, may be a partial ring, such as a semi-circular shape. In this example, the partial ring extends around an interior region 88 by greater than 180°. The partial ring is "truncated" by the side of the cooling passage network 76.

Additionally, there is one or more trip strips 86b within the interior region 88. The one or more trip strips 86b are generally smaller in volume than the trip strip 86a. In the example shown, the trip strip 86b is a full ring. As shown in the magnified sectioned view in FIG. 7, the trip strip 86b projects from the outer portion 68b of the outer wall 68 and is opposite the inlet orifice 78. In a further example, the center (C) of the ring of the trip strip 86b is coaxial with the central axis (A1) of the inlet orifice 78. A projection of the location of the inlet orifice 78 is also shown in FIG. 6 to show how the inlet orifice 78 aligns with features on the outer portion 68b of the outer wall 68. It is to be appreciated that the size and spacing of the trips strips 86a/86b may also be constrained by manufacturing limitations.

Figure 7:
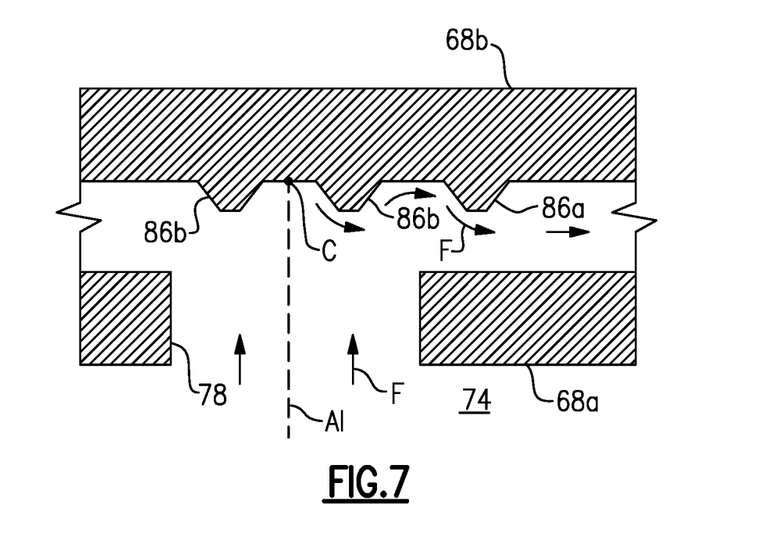
FIG. 7 illustrates a magnified view of a portion of the cooling network passage of FIG. 5.

The trip strips 86b, by being located on the hot wall, opposite the inlet orifice 78, ensure that cooling air entering the network 76 has a high convective surface area for heat transfer in comparison to a smooth/plain wall. For example, cooling air received over the trip strips 86a, and in particular into the middle of the ring, is forced to flow over the trip strip 86b and then subsequently over the trip strip 86a in order to reach the next region 82. In this regard, the configuration layout of the trip strips 86a/86b may be varied somewhat in order to tailor the heat transfer, but most typically the trip strips 86a/86b will be configured such that the flow direction is generally perpendicular to the strip direction. Depending on the length between the inlet orifices 78 and the region 82, the trip strips 86a/86b ensure that the boundary layer for the axial flow is turbulated to maintain a high heat transfer coefficient.

Figure 8:
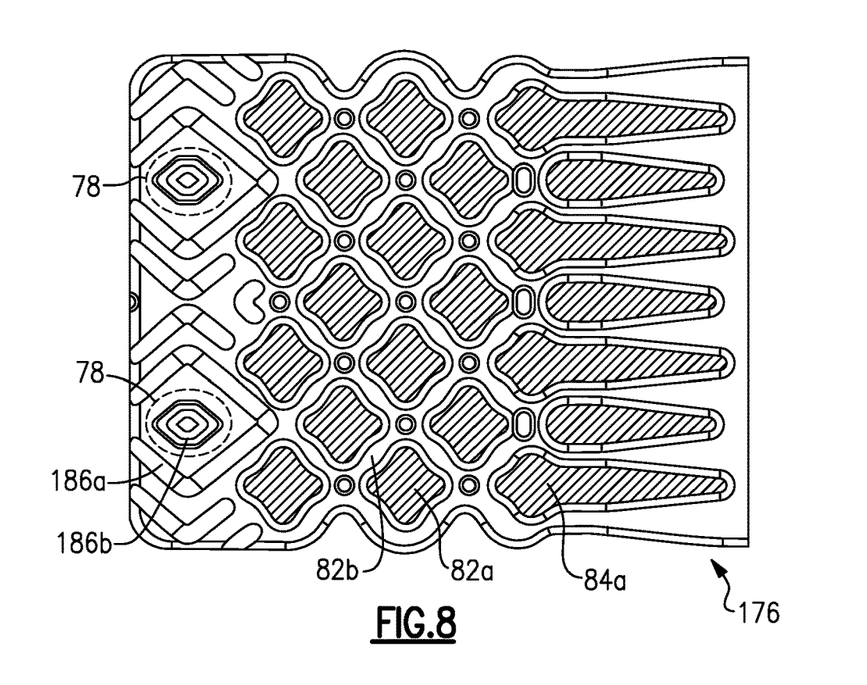
FIG. 8 illustrates another example cooling network passage that has ring-shaped trip strips.

FIG. 8 illustrates a modified example of a cooling passage network 176 that is similar to the network 76. However, rather than circular ring shape, the trips strips 186a and 186b have rectangular configurations The trip strip 186a is a partial ring, which extends around an interior region 88 by greater than 180°. The trip strip 186b is within the interior region 88 and is a full ring, although it is not circular in this example. Similar to the prior example, cooling air received onto the trip strip 186b is forced to flow over the trip strip 186b, and is then subsequently forced to flow over the trip strip 186a in order to reach the sub-passage region 82.

Figure 9:
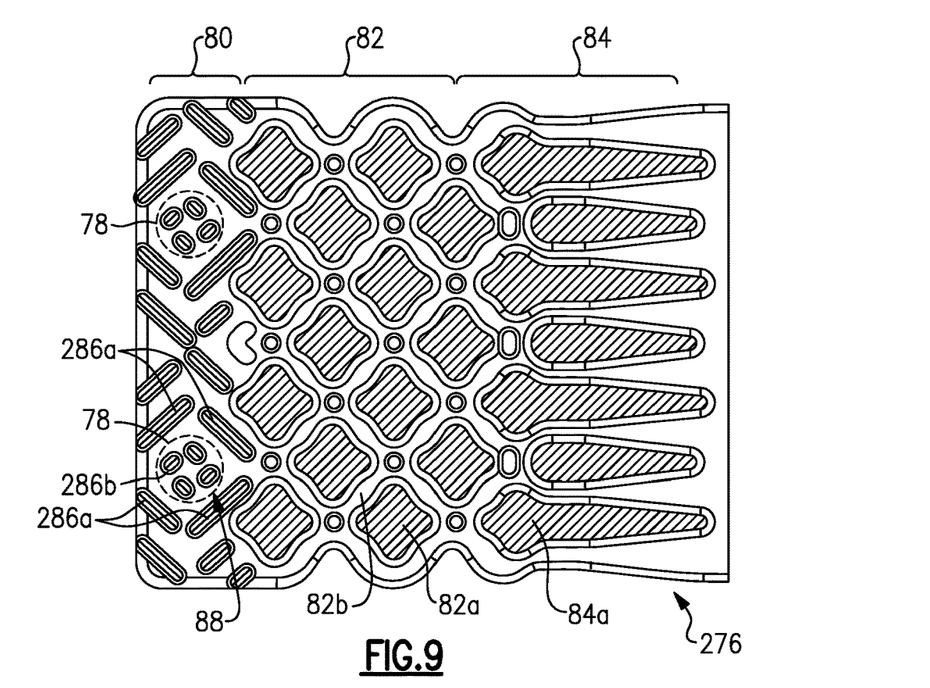
FIG. 9 illustrates another example cooling network passage that has trip strips.

FIG. 9 illustrates another modified example of a cooling passage network 276 that is similar to the network 176. However, rather than continuous rings or continuous partial rings, the trips strips 286a and 286b are discontinuous. For instance, the trip strip 286a has 4 distinct sections that together form a partial ring around the interior region 88. In one example, the sections may have common orientations. For instance, a set of 2 of the sections may be parallel to each other, and the other set of 2 sections may be parallel to each other. In a further example, the two parallel directions are perpendicular to each other. That is, the sections form an open-cornered box structure around the interior region 88.

The trip strip 286b within the interior region 88 is also discontinuous and includes multiple distinct sections. Unlike the prior example, not all of the cooling air is forced to flow over the trip strips 286b/286b because of the gaps between the sections. However, the discontinuous configuration provides additional convective surface area for flow and heat transfer.

Figure 10:
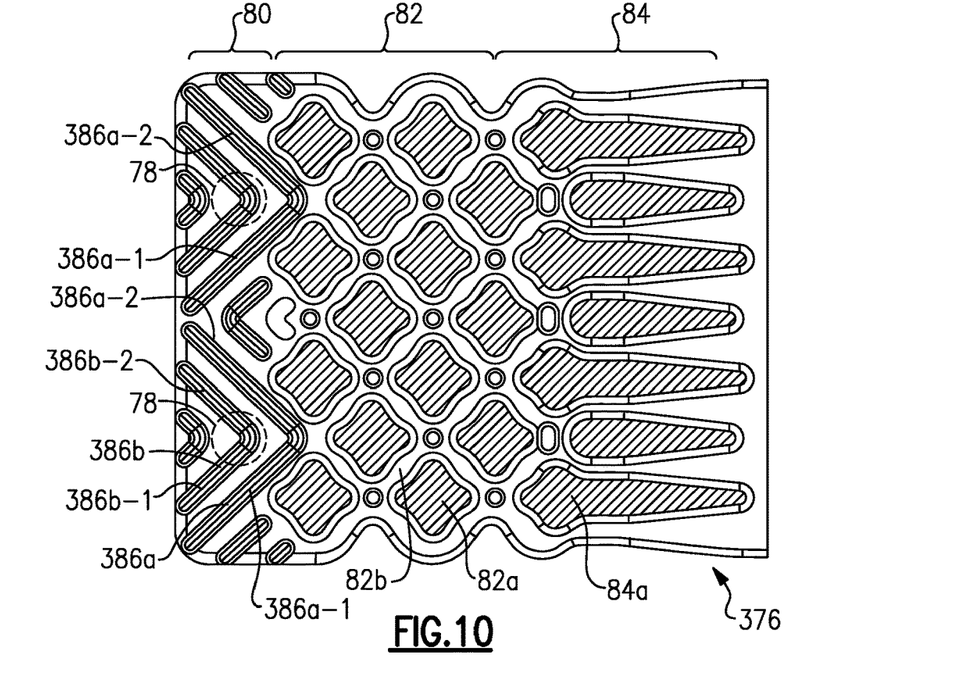
FIG. 10 illustrates another example cooling network passage that has zigzag shaped trip strips.

FIG. 10 illustrates another modified example of a cooling passage network 376. In this example, rather than rings or partial rings, the trips strips 386a and 386b have zigzag shapes. The trip strip 386a includes legs 386a-1/386a-2 that meet at a corner. In one example, the legs 386a-1/386a-2 are perpendicular to each other, but may alternatively meet at an oblique angle. In modified examples, the corners may be less pronounced and the zigzag may be a serpentine shape.

In the illustrated example, the legs 386a-1/386a-2 are continuous with the legs 386a-1/386a-2 of a second zigzag such that together the entire extent of the trip strip 386a spans the full radial length of the manifold region 80. Therefore, all cooling air that enters through the inlet orifices 78 is forced to pass over the trip strip 386a. The trip strip 386b also has a zigzag shape defined by legs 386b-1/386b-2. The trip strip 386b is located opposite the inlet orifice 78 (see projection of the inlet orifice 78 in FIG. 10). The cooling air entering the inlet orifice 78 is received into the region subtended by the legs 386b-1/386b-2. The subtended region is also bound by the side of the cooling passage network 376 and is thus forced to flow over the trip strip 386b.

Figure 11:
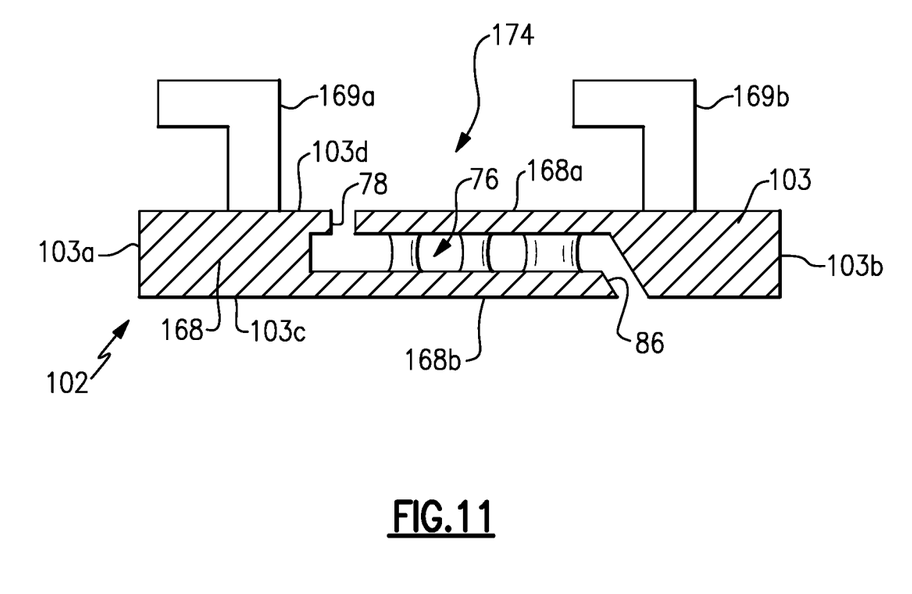
FIG. 11 illustrates an example blade outer air seal that includes a cooling passage network.

FIG. 11 illustrates another example gas turbine engine article 102, namely a blade outer air seal 103. The blade outer air seal 103 is an arc segment that is mounted in the engine 20 with like seals 103 to form an annular seal around the tips of the turbine blades. In this example, the cooling passage network 76 is employed in the blade outer air seal 103. It is to be understood that although the blade outer air seal 103 is shown with network 76, that the blade outer air seal 103 may alternatively employ any of the example networks 176/276/376 and features described or shown herein. In this example, the blade outer air seal 103 includes an article wall 168. The wall 168 defines a leading end 103a, a trailing end 103b, a gaspath side 103c, and a non-gaspath side 103d. The gaspath side 103c faces toward the core gaspath of the engine 20 and may, at times, contact tips of the turbine blades. The wall 168 defines or includes attachment members 169a/169b, which serve to secure and mount the seal 103 to a case structure in the engine 20.

The non-gaspath side 103d, and in this example also the attachment members 169a/169b, define a cavity 174. The network 76 is embedded in the wall 168 between inner and outer portions 168a/168b of the wall 168. The inlet orifice 78 of the network 76 opens through the inner portion 168a to the cavity 174. Similar to the airfoil 60, bleed air from the compressor section 24 can be provided to the cavity 174 to provide cooling air through the inlet orifice 78 into the network 76.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
an article wall defining a cavity; and
a cooling passage network embedded in the article wall between inner and outer portions of the article wall, the cooling passage network having an inlet orifice through the inner portion of the article wall to receive cooling air from the cavity, an array of pedestals bridging the inner and outer portions of the article wall, the pedestals defining there between a plurality of sub-passages located fluidly downstream from the inlet orifice to receive the cooling air therefrom, at least one outlet orifice through the outer portion of the article wall, and trip strips for mixing the cooling air in the cooling passage network, the trip strips projecting from the outer portion of the article wall partially across a distance from the outer portion to the inner portion,
wherein a first one of the trip strips is a partial ring that extends around an interior region greater than 180°;
wherein at least one the trip strips is a ring and is within the interior region; and
wherein the partial ring is next to the ring.

2. The article as recited in claim 1, wherein at least one of the trip strips projects from the outer portion of the article wall and is aligned opposite the inlet orifice.

3. The article as recited in claim 1, wherein the inlet orifice opens to a radially-elongated manifold region of the cooling passage network that is upstream of the plurality of sub-passages.

4. A gas turbine engine comprising:
a compressor section;
a combustor in fluid communication with the compressor section; and
a turbine section in fluid communication with the combustor,
the turbine section having a turbine engine article that includes
an article wall defining a cavity, and
a cooling passage network embedded in the article wall between inner and outer portions of the article wall, the cooling passage network having an inlet orifice through the inner portion of the article wall to receive cooling air from the cavity, an array of pedestals bridging the inner and outer portions of the article wall, the pedestals defining there between a plurality of sub-passages located fluidly downstream from the inlet orifice to receive the cooling air therefrom, at least one outlet orifice through the outer portion of the article wall, and trip strips for mixing the cooling air in the cooling passage network, the trip strips projecting from the outer portion of the article wall partially across a distance from the outer portion to the inner portion, wherein a first one of the trip strips is a partial ring that extends around an interior region greater than 180°;

wherein at least one the trip strips is a ring and is within the interior region; and wherein the partial ring is next to the ring.

5. The article as recited in claim 1, wherein the pedestals are arranged in rows that are staggered relative to each other, and the pedestals have a cross-sectional geometry that is selected from the group consisting of a lobed-diamond, polygon, round, oval, and elliptical.

\* \* \* \* \*